(12) United States Patent
Patkar et al.

(10) Patent No.: US 9,846,963 B2
(45) Date of Patent: Dec. 19, 2017

(54) 3-DIMENSIONAL MODEL GENERATION USING EDGES

(71) Applicant: Samsung Electronics Co., Ltd., Gyeonggi-Do (KR)

(72) Inventors: Saket Patkar, Stanford, CA (US); Bo Li, San Jose, CA (US); Tasneem Brutch, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 117 days.

(21) Appl. No.: 14/725,938

(22) Filed: May 29, 2015

(65) Prior Publication Data

US 2016/0098858 A1 Apr. 7, 2016

Related U.S. Application Data

(60) Provisional application No. 62/059,662, filed on Oct. 3, 2014.

(51) Int. Cl.
*G06T 17/00* (2006.01)
*G06T 7/00* (2017.01)
*G06T 7/73* (2017.01)
*G06T 7/593* (2017.01)

(52) U.S. Cl.
CPC .......... *G06T 17/00* (2013.01); *G06T 7/593* (2017.01); *G06T 7/73* (2017.01); *G06T 2207/10012* (2013.01); *G06T 2207/30244* (2013.01)

(58) Field of Classification Search
CPC ..... G06T 17/00; G06T 7/0042; G06T 7/0061; G06T 7/0075; G06T 7/0085; G06T 2207/10012; G06T 2207/30244
See application file for complete search history.

(56) References Cited

U.S. PATENT DOCUMENTS

| | | | |
|---|---|---|---|
| 6,816,629 B2 | 11/2004 | Redlich | |
| 7,359,526 B2 | 4/2008 | Nister | |
| 7,583,275 B2 | 9/2009 | Neumann et al. | |
| 8,442,305 B2 | 5/2013 | Ramalingam | |
| 8,532,367 B2 | 9/2013 | Kaganovich | |
| 8,681,150 B2 * | 3/2014 | Kim | G06K 9/00697 345/420 |

(Continued)

FOREIGN PATENT DOCUMENTS

| | | |
|---|---|---|
| JP | H10304244 A | 11/1998 |
| KR | 20040034221 A | 4/2004 |

(Continued)

OTHER PUBLICATIONS

WIPO Appln. PCT/KR2015/010518, International Search Report, dated Feb. 24, 2016, 3 pg.

(Continued)

*Primary Examiner* — Sean Conner
*Assistant Examiner* — Pinalben Patel
(74) *Attorney, Agent, or Firm* — Cuenot, Forsythe & Kim, LLC

(57) ABSTRACT

3-dimensional model generation using edges may include detecting, using a processor, a plurality of edges in a plurality of images and determining, using the processor, a set edges from the plurality of edges that are matched across the plurality of images. Camera poses of the plurality of images may be estimated using the processor and using a cost function that depends upon the set of edges.

15 Claims, 5 Drawing Sheets

(56) References Cited

U.S. PATENT DOCUMENTS

| | | | |
|---|---|---|---|
| 8,798,965 B2 | 8/2014 | Quan et al. | |
| 2002/0110273 A1 | 8/2002 | Dufour | |
| 2004/0227820 A1* | 11/2004 | Nister | G06K 9/209 348/207.99 |
| 2007/0031064 A1* | 2/2007 | Zhao | G06K 9/00214 382/285 |
| 2007/0253618 A1 | 11/2007 | Kim et al. | |
| 2008/0310757 A1 | 12/2008 | Wolberg et al. | |
| 2009/0010507 A1 | 1/2009 | Geng | |
| 2009/0207257 A1* | 8/2009 | Jung | G06T 7/0042 348/208.1 |
| 2009/0268214 A1 | 10/2009 | Lucic et al. | |
| 2011/0043540 A1 | 2/2011 | Fancher et al. | |
| 2011/0123096 A1* | 5/2011 | Tsai | G06T 7/0085 382/154 |
| 2012/0148145 A1* | 6/2012 | Liu | G06T 7/0075 382/154 |
| 2014/0003705 A1 | 1/2014 | Taguchi et al. | |
| 2014/0016821 A1* | 1/2014 | Arth | G06K 9/00671 382/103 |
| 2014/0105486 A1* | 4/2014 | Tamaazousti | G06T 7/0071 382/154 |
| 2014/0270360 A1* | 9/2014 | Kim | G06T 7/2033 382/103 |
| 2014/0285486 A1 | 9/2014 | Chang et al. | |

FOREIGN PATENT DOCUMENTS

| | | |
|---|---|---|
| WO | 0167749 A2 | 9/2001 |
| WO | 2016053067 A1 | 4/2016 |

OTHER PUBLICATIONS

Hofer, M. et al., "Incremental Line-Based 3D Reconstruction Using Geometric Constraints," In Proc. of the British Machine Vision Conference (BMVC 2013), Bristol, UK. 2013, 11 pg.

Sinha, S.N. et al., "Interactive 3D Architectural Modeling From Unordered Photo Collections," In ACM Transactions on Graphics (TOG), vol. 27, No. 5, 10 pp., 2008.

Furukawa, Y. et al., "Manhattan-World Stereo," In IEEE Conference on Computer Vision and Pattern Recognition, (CVPR 2009), pp. 1422-1429, 2009.

Dou, M. et al., "Exploring High-Level Plane Primitives for Indoor 3D Reconstruction With a Hand-Held RGB-D Camera," In Computer Vision-ACCV 2012 Workshops, pp. 94-108, Springer Berlin Heidelberg, 2013.

Snavely, N. et al., "Photo Tourism: Exploring Photo Collections in 3D," In ACM Transactions on Graphics (TOG), vol. 25, No. 3, pp. 835-846, 2006.

Furukawa, Y. et al., "Accurate, Dense, and Robust Multiview Stereopsis," In IEEE Transactions on Pattern Analysis and Machine Intelligence, vol. 32, No. 8, pp. 1362-1376, 2010.

Bartoli, A. et al., "Structure-From-Motion Using Lines: Representation, Triangulation, and Bundle Adjustment," Computer Vision and Image Understanding, vol. 100, No. 3, pp. 416-441, 2005.

Wang, Z. et al., "HLD: A Robust Descriptor for Line Matching," In 11th IEEE Int'l. Conf. on Computer-Aided Design and Computer Graphics, (CAD/Graphics'09), pp. 128-133, 2009.

Zhang, Yueqiang, Heng Yang, and Xiaolin Liu. "A line matching method based on local and global appearance." In Image and Signal Processing (CISP), 2011 4th International Congress on, vol. 3, pp. 1381-1385. IEEE, 2011.

Jain, A. et al., "Exploiting Global Connectivity Constraints for Reconstruction of 3D Line Segments From Images," In IEEE Conference on Computer Vision and Pattern Recognition (CVPR), pp. 1586-1593, 2010.

Al-Shahri, M. et al., "Line Matching in Wide-Baseline Stereo: A Top-Down Approach," In IEEE Signal Processing Society Transactions on Image Processing, 24 pp. 2014.

Hofer, M. et al., "Line-based 3D Reconstruction of Wiry Objects," In Computer Vision Winter Workshop. 8 pp., 2013.

* cited by examiner

3-DIMENSIONAL MODEL GENERATION USING EDGES

CROSS-REFERENCE TO RELATED APPLICATIONS

This application claims the benefit of U.S. Provisional Patent Application No. 62/059,662 filed on Oct. 3, 2014, which is fully incorporated herein by reference.

TECHNICAL FIELD

This disclosure relates to 3-dimensional model generation using edges.

BACKGROUND

A 3-dimensional (3D) model may be reconstructed from multiple 2-dimensional (2D) images of a scene. The 2D images may be taken by one or more cameras using various camera poses. Conventional 3D model generation techniques rely upon feature point recognition. Typically, the 2D images are processed to identify feature points that are matched across the multiple 2D images. The feature points may be triangulated in three dimensions. Re-projection error between the actual location of the feature points and the re-projected feature points from three dimensions back to two dimensions along with camera pose error both may then be minimized.

Many 2D images include textureless regions. Textureless regions may occur in 2D images of outdoor scenes and are often found in 2D images of indoor scenes. A textureless region generally refers to a region in a 2D image where the pixels are the same or highly similar. The deviation from one pixel to the next is minimal or non-existent. A textureless region within a 2D image typically represents a smooth surface without detail. Examples of textureless regions may include, but are not limited to, walls, countertops, and the like, including those of relatively constant color.

Conventional 3D model generation techniques tend to perform relatively well when processing texture rich 2D images. In situations where the 2D images include textureless regions, however, conventional 3D model generation techniques tend to underperform. Conventional techniques often require a large number of 2D images as input to determine sufficient feature points to reconstruct even a small region. Because textureless regions have little or no feature points, conventional techniques for 3D model generation involving textureless regions are often flawed. Further, the estimation of camera poses tends to be inaccurate.

SUMMARY

A method may include detecting, using a processor, a plurality of edges in a plurality of images and determining, using the processor, a set edges from the plurality of edges that are matched across the plurality of images. The method may also include estimating, using the processor, camera poses of the plurality of images using a cost function that depends upon the set of edges.

A system includes a processor programmed to initiate executable operations. The executable operations may include detecting a plurality of edges in a plurality of images and determining a set edges from the plurality of edges that are matched across the plurality of images. The executable operations may also include estimating camera poses of the plurality of images using a cost function that depends upon the set of edges.

A computer program product includes a computer readable storage medium having program code stored thereon. The program code is executable by a processor to perform a method. The method may include detecting, using the processor, a plurality of edges in a plurality of images and determining, using the processor, a set edges from the plurality of edges that are matched across the plurality of images. The method may also include estimating, using the processor, camera poses of the plurality of images using a cost function that depends upon the set of edges.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIGS. 5-1, 5-2, 5-3, and 5-4 are different images of an interior scene.

DETAILED DESCRIPTION

Figure 1:
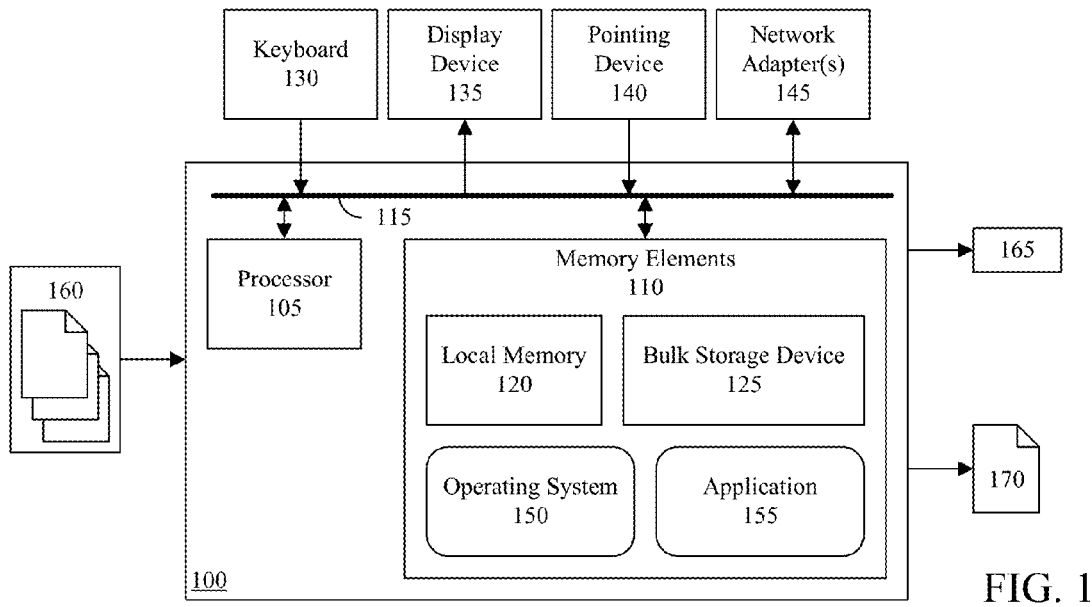
FIG. 1 is block diagram illustrating an exemplary data processing system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to 3-dimensional (3D) model generation using edges. In accordance with the inventive arrangements described within this disclosure, 2-dimensional (2D) images may be processed to identify edges contained therein. The edges may be processed to identify same edges across different ones of the 2D images. Camera poses may be estimated using a cost function that depends, at least in part, upon the edges.

Using the estimated camera poses, a 3D model may be generated. For example, the 3D model may be a 3D room scene. 3D models may be generated using 3D points, triangular meshes, 3D voxels, or the like. In one aspect, generating the 3D model may include one or more additional operations such as determining axes, determining planes based upon the edges, removing false planes, and rendering the planes in 3D space. The planes may represent textureless regions.

Utilizing edge-based processing as described herein, textureless regions may be rendered in a 3D model with greater accuracy than is the case with other conventional techniques. Due to a characteristic lack of feature points in textureless regions, conventional techniques that rely solely upon feature points are often ill suited to render textureless regions. Often, the textureless regions appear incomplete in a reconstructed 3D model. For example, a textureless region such as a wall, as represented within a 3D model, may appear to have many holes, gaps, or appear partially formed. Further, the camera poses estimated using feature points are often inaccurate, leading to inaccurate 3D model generation.

While the embodiments disclosed herein are directed to the use of edges, it should be appreciated that feature points may be utilized in combination with edge-based techniques. Feature points and edges, for example, both may be used for purposes of estimating camera poses, generating planes, and the like.

The inventive arrangements described herein may be implemented as a method or process performed by a data processing system. In another aspect, the inventive arrangements may be implemented as an apparatus such as a data processing system having a processor. The processor, upon executing program code, may perform one or more operations described herein. In still another aspect, the inventive arrangements may be implemented as a non-transitory computer-readable storage medium storing program code that, when executed, causes a processor and/or a system to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary data processing system (system) 100. As pictured, system 100 includes at least one processor, e.g., a central processing unit (CPU), 105 coupled to memory elements 110 through a system bus 115 or other suitable circuitry. System 100 stores program code within memory elements 110. Processor 105 executes the program code accessed from memory elements 110 via system bus 115. Memory elements 110 include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from bulk storage device 125 during execution.

Input/output (I/O) devices such as a keyboard 130, a display device 135, and a pointing device 140 may optionally be coupled to system 100. In some cases, one or more of the I/O devices may be combined as in the case where a touchscreen is used as display device 135. In that case, display device 135 may also implement keyboard 130 and pointing device 140.

The I/O devices may be coupled to architecture 100 either directly or through intervening I/O controllers. One or more network adapters 145 may also be coupled to system 100 to enable architecture 100 to become coupled to other systems, computer systems, remote printers, and/or remote storage devices through intervening private or public networks. Modems, cable modems, Ethernet cards, and wireless transceivers are examples of different types of network adapter 145 that may be used with architecture 100. Depending upon the particular device implemented with architecture 100, the specific type of network adapter, or network adapters as the case may be, will vary.

As pictured in FIG. 1, memory elements 110 may store an operating system 150 and one or more applications 155. In one aspect, operating system 150 and application 155, being implemented in the form of executable program code, are executed by system 100 and, in particular, processor 105. As such, operating system 150 and application 155 may be considered an integrated part of system 100. Operating system 150, application 155, and any data items used, generated, and/or operated upon by system 100 are functional data structures that impart functionality when utilized by system 100.

In one aspect, system 100 may be a computer or other device that is suitable for storing and/or executing program code. System 100 may represent any of a variety of computer systems and/or devices that include a processor and memory and that are capable of performing the operations described within this disclosure. In some cases, the particular computer system and/or device may include fewer components or more components than described. System 100 may be implemented as a single system as shown or as a plurality of networked or interconnected systems each having an architecture the same as, or similar to, that of system 100.

In operation, system 100 may receive a plurality of 2-dimensional (2D) images 160. 2D images 160 may be of a particular scene. 2D images 160 may be taken using one camera or using different cameras. Further, 2D images 160 may be taken from different vantage points, e.g., taken using different camera poses. As known in the art, a "camera pose" refers to the position and orientation of a camera when taking an image. In this case, the image is a 2D image.

In one aspect, system 100 may detect a plurality of edges within 2D images 160. System 100 further may determine a set edges from the plurality of edges that are matched across the 2D images 160. System 100 further may estimate camera poses 165 for 2D images 160, using a cost function that depends upon the set of edges. The system may also generate a 3D model 170 using the camera poses. In one aspect, the system may generate one or more planes in 3D model 170 that represent one or more textureless regions in images 160 as described within this disclosure in further detail.

Figure 2:
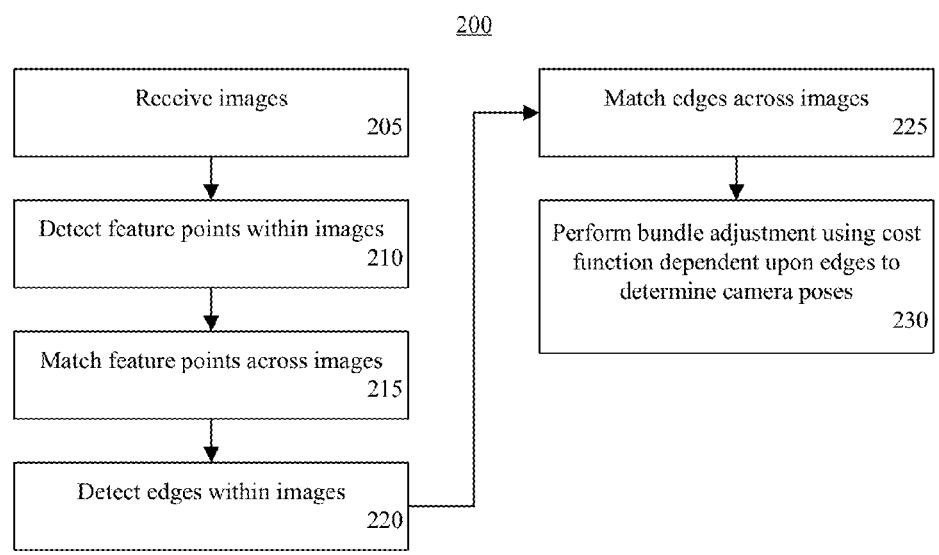
FIG. 2 is a flow chart illustrating an exemplary method of 3-dimensional (3D) model generation.

FIG. 2 is a flow chart illustrating an exemplary method 200 of 3D model generation. Method 200 may be implemented by a system as described with reference to FIG. 1.

Method 200 begins in block 205, where the system may receive images. The images may be 2D such as photographs. The images may be of a same 3D scene and in digital form. In general, there may be no constraints placed on the images. The images may be taken at different times, under different lighting conditions, and may include non-rigid objects such as human beings. In one aspect, the images may be obtained through crowd sourcing. The images may be unordered. Further, the images may include one or more textureless regions. In addition, there may be no constraints placed on the cameras used to capture the images. The cameras, for example, do not require additional sensors. The images may be captured by a same camera or by two or more different cameras.

In block 210, the system may detect feature points within the images. The system may detect feature points using any of a variety of known feature point detection techniques. In block 215, the system may match feature points across images. For example, the system determines which feature point in a first image matches, or is the same as, a feature point found in another, different image. In one aspect, the system may consider pairs of images and determine a matching of feature points for the pairs. Each pair of images may considered for purposes of matching feature points.

Matching feature points may include outliers that the system may be able to filter or otherwise remove. In one aspect, for example, the system may filter outlier feature points by approximating the fundamental matrix between every pair of images using the outlier matches. Pairwise matches between feature points may be organized into tracks. In one example, each track may specify a list of image-feature point pairs, where each feature point in a track is identified as a same feature point across the images listed in the track. The system may identify those tracks that include a same image more than one time. A track that includes an image more than one time indicates that a feature point has been matched to different feature points in at least one other image. Accordingly, the system may delete, or remove, any image appearing in a track more than one time.

In performing block 215, the system may determine a set of feature points that are matched across the images. The set of feature points may be the entirety of the feature points within the images or a subset of the feature points detected within the images.

In block 220, the system may detect edges within the images. The system may implement an edge detection technique to detect one or more edges within the received images. Any of a variety of known edge detection technique may be used. In another aspect, any of a variety of known line detection techniques may be used to identify edges. In block 225, the system may match detected edges across the images. In one embodiment, the system may check each possible pair of edges to determine, on an image pairwise basis, whether each pair of edges satisfies the epipolar constraint. Using the epipolar constraint may be time consuming and require significant computational resources. In another embodiment, the previously matched feature points and intrinsic matrix may be used to localize edge matching thereby reducing the cost of computation.

In another aspect, the system may create tracks for the edges. A track may specify one or more pairs of images and a matched edge for each image. For example, a track for edges may specify a list of image-edge pairs, where each edge in a track is identified as a same edge across the images listed in the track. In some cases, the same edge may be not be found or located in each image. In that case, the track may be deleted as the system may interpret the edge as being a false edge.

In performing block 225, the system may determine a set of edges that are matched across the images. The set of edges may be the entirety of the edges detected within the images or a subset of the edges detected within the images.

In block 230, the system may perform bundle adjustment. In general, bundle adjustment refers to a process where 3D coordinates describing scene geometry and camera poses for the cameras used to capture the images are determined. For example, given a set of images depicting a number of 3D points from different viewpoints, bundle adjustment may include refining 3D coordinates describing the scene geometry and camera poses of the camera(s) used to acquire the images. The process refines the various parameters noted according to an optimality criterion. In one aspect, the optimality criterion may involve the corresponding image projections of feature points and/or image projections of edges. The system, for example, may perform an incremental bundle adjustment process. An example of incremental bundle adjustment process is described in Snavely et al., "Photo tourism: exploring photo collections in 3D," ACM Transactions on Graphics, vol. 25, issue 3, pps. 835-846 (July 2006).

In accordance with an embodiment, bundle adjustment may be performed using an optimality criterion, e.g., a cost function, as illustrated below in Expression 1.

$$\frac{\alpha}{N_l}\sum_i \sum_j c_{ij}(\beta_1\|\theta_{ij}^p - \theta_{ij}\| + \beta_2\|l_{ij}^p - l_{ij}\| + \|p_{ij}^1 - o_{ij}^1\| + \|p_{ij}^2 - o_{ij}^2\|) + \quad (1)$$

$$\frac{(1-\alpha)}{N_p}\sum_i \sum_j w_{ij}\|q_{ij} - P(\Theta_i, p_j)\|$$

Within Expression 1, $N_l$ is the number of lines; $N_p$ is the number of feature points; $\alpha$ controls the weight between the lines and the points. For example, $\alpha=1$ uses only lines and $\alpha=0$ uses only feature points. Expression 1 operates over i to n cameras and over j to m tracks.

For purposes of discussion, Expression 1 may be said to be formed of two sub-expressions illustrated below and referred to as Expressions 2 and 3. Expression 2 is dependent upon edges. Expression 3 is dependent upon feature points.

$$\frac{\alpha}{N_l}\sum_i \sum_j c_{ij}(\beta_1\|\theta_{ij}^p - \theta_{ij}\| + \beta_2\|l_{ij}^p - l_{ij}\| + \|p_{ij}^1 - o_{ij}^1\| + \|p_{ij}^2 - o_{ij}^2\|) \quad (2)$$

$$\frac{(1-\alpha)}{N_p}\sum_i \sum_j w_{ij}\|q_{ij} - P(\Theta_i, p_j)\| \quad (3)$$

Expression 2 may be considered the reprojection error for lines, or edges, with $c_{ij}$ being the weight for the $j^{th}$ line with respect to the $i^{th}$ camera. The first portion $\beta_1\|\theta_{ij}^p - \theta_{ij}\|$ quantifies the error in orientation of the edges. For example, the first portion $\beta_1\|\theta_{ij}^p - \theta_{ij}\|$ defines the angle between the original edge in the image and the projection of the edge in 3D space. The second portion $\beta_2\|l_{ij}^p - l_{ij}\|$ quantifies error in the length of the edges. For example, the second portion $\beta_2\|l_{ij}^p - l_{ij}\|$ defines the difference between the length of the original line and the projected line in 3D space. The third portion $\|p_{ij}^1 - o_{ij}^1\| + \|p_{ij}^2 - o_{ij}^2\|$ quantifies error in the end points. For example, the third portion $\|p_{ij}^1-o_{ij}^1\|+\|p_{ij}^2-o_{ij}^2\|$ measures the reprojection error for the endpoints of the line and the line projected in 3D space. The values $\beta_1$, $\beta_2$, and $\beta_3$ control the weight of the first portion, the second portion, and the third portion, respectively.

Given $(\vec{o}_{ij}^1, \vec{o}_{ij}^2)$ as the endpoints of line j in image i, and $(\vec{p}_{ij}^1, \vec{p}_{ij}^2)$ as the endpoints of the projection of the 3D coordinates of line j on image i, the first and second portions may be determined as illustrated below in Expressions 4 and 5. Within Expression 4 below, $\vec{x}$ is the x-axis.

$$\theta_{ij}^P = \cos^{-1}((\vec{p}_{ij}^2 - \vec{p}_{ij}^1)\cdot \vec{x}), \theta_{ij} = \cos^{-1}((\vec{o}_{ij}^2 - \vec{o}_{ij}^1)\cdot \vec{x}) \quad (4)$$

$$l_{ij}^P = \|\vec{p}_{ij}^1 - \vec{p}_{ij}^2\|, l_{ij} = \|\vec{o}_{ij}^1 - \vec{o}_{ij}^2\| \quad (5)$$

Expression 3 defines a reprojection cost and is further described within Snavely et al., "Photo tourism: exploring photo collections in 3D," ACM Transactions on Graphics, vol. 25, issue 3, pps. 835-846 (July 2006). In general, $\Theta_i$ is a matrix for 3D to 2D conversion that includes camera poses. In one aspect, within Expression 3, $\Theta_i$ may be implemented as defined within Snavely et al. For example, $\Theta_i$ may be a vector (or matrix) of camera parameters including rotation (formed of three parameters), camera center (formed of three parameters), and focal length.

In another aspect, within Expression 3, $\Theta_i$ may be a matrix that represents camera properties including camera poses as noted. For example, $\Theta_i$ may be a matrix representing intrinsic and extrinsic camera parameters. Intrinsic camera parameters relate to a camera's projection properties and may include parameters for focal length, image sensor format, and principal point. Extrinsic parameters may include camera transformations and rotations in world coordinates, e.g., camera center.

The set of n cameras is parameterized by $\Theta_i$. The set of m tracks is parameterized by $p_j$. The term $q_{ij}$ represents the observed projection of the $j^{th}$ track in the $i^{th}$ camera. Accordingly, the term $P(\Theta_i, p_j)$ is the projection equation that maps a 3D point p to the 2D projection of the point in a camera with parameters $\Theta$. The term $w_{ij}$ is used as an indicator variable where $w_{ij}=1$ if camera i observes point j, and $w_{ij}=0$ otherwise.

Following block 230, having minimized the cost function described above, the camera poses for the images are determined. As discussed, the camera poses define the position and orientation of the camera(s). In one aspect, using the determined camera poses, a 3D model may be generated.

Figures 3, 4:
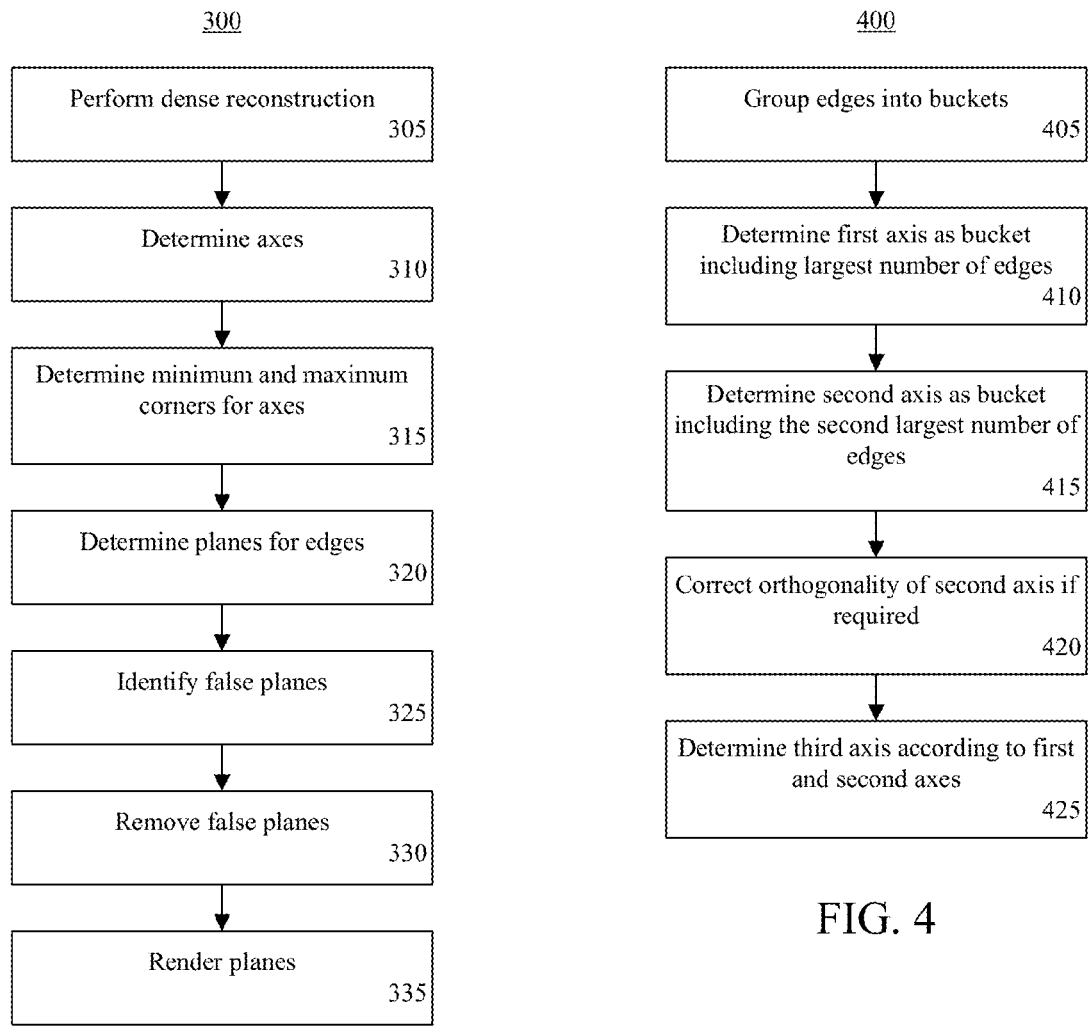
FIG. 3 is a flow chart illustrating an exemplary method of generating planes.
FIG. 4 is a flow chart illustrating an exemplary method of determining axes.

FIG. 3 is a flow chart illustrating another exemplary method 300 of 3D reconstruction. Method 300 may be performed by a system as described with reference to FIG. 1. In one aspect, method 300 may begin in a state where method 200 has been performed and camera poses have been determined.

In block 305, the system may perform dense reconstruction. Dense reconstruction generally refers to the creation of a 3D model, e.g., a dense point cloud, from the collected images of a scene using the camera poses. The dense point cloud includes the set of feature points and the set of edges. In one exemplary implementation, the dense reconstruction technique used in block 305 may be that described in Furukawa et al., "Accurate, Dense, and Robust Multi-View Stereopsis," IEEE Transactions on Pattern Analysis and Machine Intelligence, vol. 32, issue 8, pps. 1362-1376 (2010).

In block 310, the system may determine the three dominant axes for the 3D model. In one aspect, the 3D model may be for an indoor environment or scene, e.g., a room. In most cases, indoor environments have three dominant axes that may be determined. In block 315, the system may determine the minimum and the maximum corners along each of the dominant axes determined in block 310.

In block 320, the system may determine planes for edges. Given the minimum and maximum corners, the system may fit planes to the edges of the set of edges within the dense point cloud. For example, for each edge, the system may attempt to fit planes to the edge by putting two perpendicular planes along the dominant axes with the planes extending to the previously determined corners. In one aspect, the system may focus on identifying walls or other surfaces such as countertops, cabinets, etc.

In illustration, the system may select an edge from the set of edges. The system determines the particular axis with which the selected edge is aligned. For example, the system may determine that the edge is aligned with the x-axis. The system will generate two planes for the selected edge. An edge aligned with the x-axis, for example, may be used to generate a first plane along the edge that is parallel to the x-z plane and a second plane along the edge that is parallel to the x-y plane. The system does not, for example, generate a plane that is parallel to the y-z plane.

In one aspect, the system further may identify planes that are parallel and close to one another, e.g., within a predetermined distance of one another. The system may determine that parallel planes within a predetermined distance of one another represent a same plane. The system may merge, or combine, the identified planes into a single plane.

In another aspect, determining planes for edges may include cutting planes with respect to each other. In some cases, a plane extending in one direction may be crossed, or cut, by a perpendicular plane. The crossing, or cutting of planes by other perpendicular planes serves to define segments in the planes. A segment, for example, may be a portion of a plane between two crossing perpendicular planes or a portion of a plane between a crossing perpendicular plane and an outer edge of the scene as defined by the minimum and maximum corners.

In block 325, the system may identify false planes. Referring to block 320, each plane that is generated may not be a true plane. In one aspect, the system may distinguish a false plane from a true plane according to whether the plane has feature points located on each side of the plane. The system made determine that a plane that has 3D feature points on one side, but not on the other side, for example, is a true plane. The true plane may be a wall, a partial wall or divider, or other textureless surface. A true plane may also have 3D feature points on the plane itself. The system further may determine that a generated plane that has 3D feature points on both sides of the plane is a false plane.

In one aspect, the determination of whether a plane is a false plane may be made for the entire plane as a whole. The plane, when determined to be a false plane, may be removed in its entirety. In another aspect, the determination of whether a plane is false may be performed on a per-segment basis. In that case, only those segments of a plane determined to be false using the criteria described above may be removed. This allows a portion of a plane, e.g., one or more segments, to remain as a true plane, while one or more other segments of the plane determined to be false may be removed.

In block 330, the system may remove, or delete, the false planes. Performing block 330 leaves only those planes that the system has determined are true planes. In one aspect, once the true planes are determined and false planes removed, a more accurate representation of walls in the scene is obtained. In that case, the system may correct, or adjust, the point cloud with respect to the determined planes to better align both the representations, e.g., the planes and the dense point cloud.

In block 335, the system may render the planes. The system may render the planes within the 3D model, for example, as part of final plane generation. The resulting planes are fully formed, solid regions. The planes do not include holes or other artifacts commonly found textureless regions in 3D models created by relying solely on feature points. As part of block 335, the system may also project textures onto the planes.

FIG. 4 is a flow chart illustrating an exemplary method 400 of determining axes. Method 400 may be performed by a system as described with reference to FIG. 1. In one embodiment, method 400 may be performed to implement block 310 of FIG. 3.

In block 405, the system groups the edges determined from the images into different buckets. The system operates on those edges that are members of the set of edges matched across images. The system may group the edges into three different buckets according to orientation. Edges of a like orientation, or having an orientation within a predetermined amount of one another, for example, may be placed or assigned into a same bucket. The term "bucket," as defined herein, refers to a class of edges from the set of edges that have a same or similar orientation.

In block 410, the system determines that the first axis is the bucket having the largest number of edges assigned thereto. The bucket with the largest number of edges may be considered the most dominant direction and may be considered one, e.g., a first, of three orthogonal axes. In block 415, the system may determine that the second axis is the bucket having the second largest number of edges assigned thereto (where the second largest number of edges is less than the first largest number of edges). The bucket with the second largest number of edges may be considered the second most dominant direction and may be considered one, e.g., a second, of the three orthogonal axes.

In block 420, the system may correct orthogonality between the first dominant axis and the second dominant axis. In one example, the system may apply the Gram-Schmidt technique to the second axis make the second axis orthogonal to the first. By applying a corrective measure such as Gram-Schmidt, the system may make the second axis exactly orthogonal to the first axis.

In block 425, the system may determine a third axis according to the first axis and the second axis. The system may determine the third axis, representing the third most dominant direction, as the cross-product of the first axis and the second axis.

The process described with reference to FIG. 4 ensures that the resulting axes are perpendicular to one another. Other conventional techniques for determining dominant directions that rely upon normals calculated from dense points tend to be inaccurate due to the existence of textureless regions. In accordance with the inventive arrangements disclosed herein, the system ensures that the axes are perpendicular to one another by applying a correction to the second axis as necessary and computing the third axis as the cross-product of the first axis and the second axis, thereby ensuring that all three axes are perpendicular to one another.

Figures 1, 5:
Figures 2, 5:
Figures 3, 5:
Figures 4, 5:
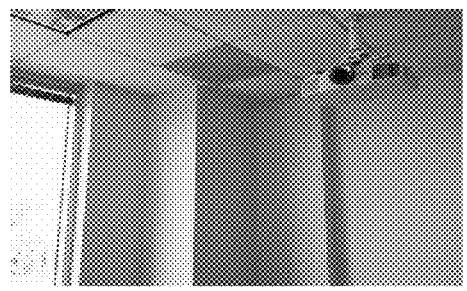

FIGS. 5-1, 5-2, 5-3, and 5-4 (collectively referred to as FIG. 5) are images of a scene. The photographs of FIG. 5 depict an interior room. As illustrated, the images of FIG. 5 are taken using different camera poses.

Figure 6:
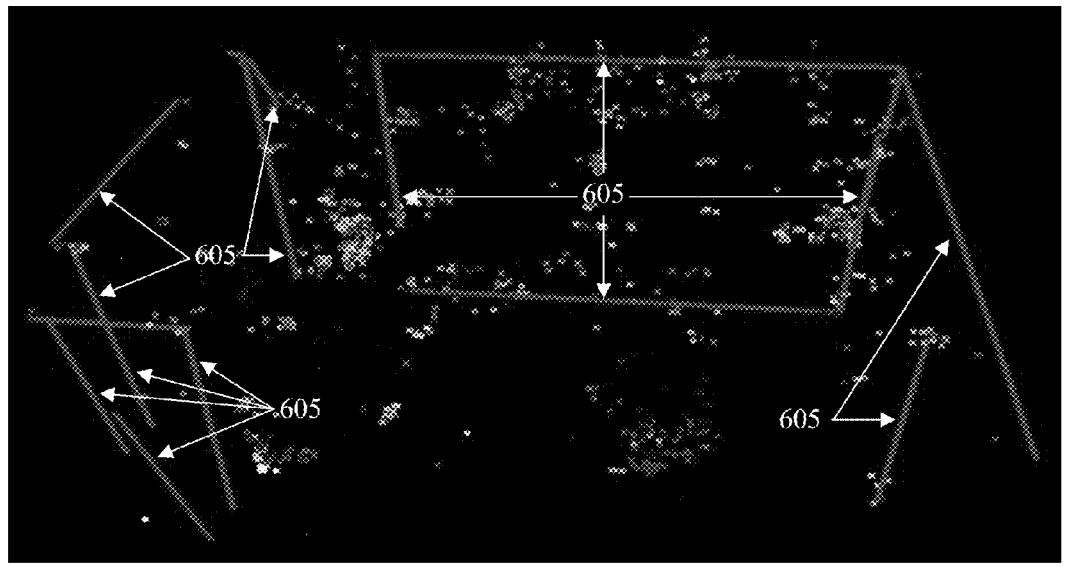
FIG. 6 is a perspective view of a dense point cloud for the scene of FIG. 5.

FIG. 6 is a perspective view of a dense point cloud for the scene of FIG. 5. The dense point cloud of FIG. 6 illustrates the detected feature points matched across the images. The dense point cloud further illustrates the edges 605 matched across the images and positioned within the dense point cloud after the three axes have been determined.

Figure 7:
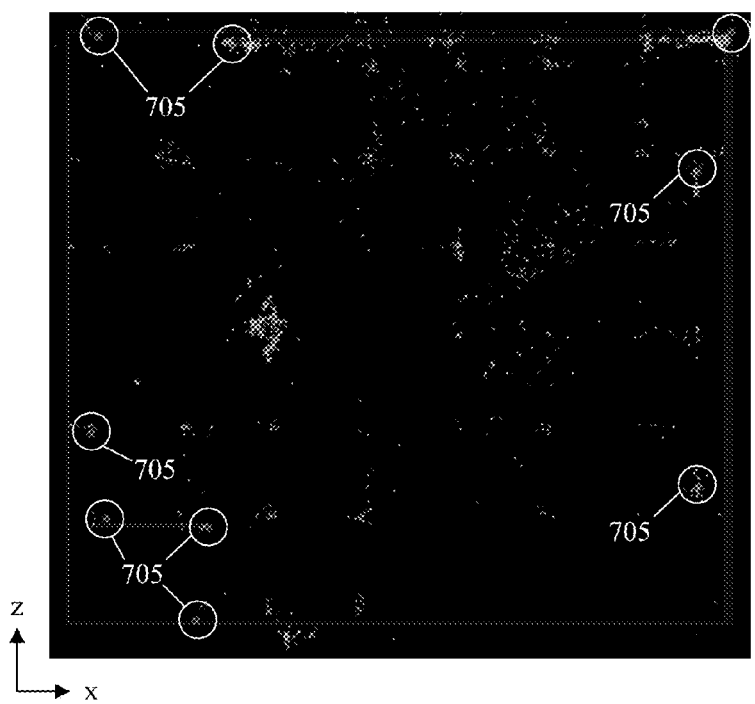
FIG. 7 is an overhead plan view of the dense point cloud of FIG. 6.

FIG. 7 is an overhead plan view of the dense point cloud of FIG. 6. The plan view shows the dense point cloud from a perspective of looking down the y-axis, where vertical lines parallel to the y-axis appear as points. The y-axis aligned edges from FIG. 6 now appear as dots, or points 705. FIG. 7 also illustrates the minimum and maximum corners for the determined axes. In this example, being a plan view, the minimum and maximum corners are pictured for the x-z plane. The minimum and maximum corners may be used to define the boundaries, or borders of the interior room.

Figure 8:
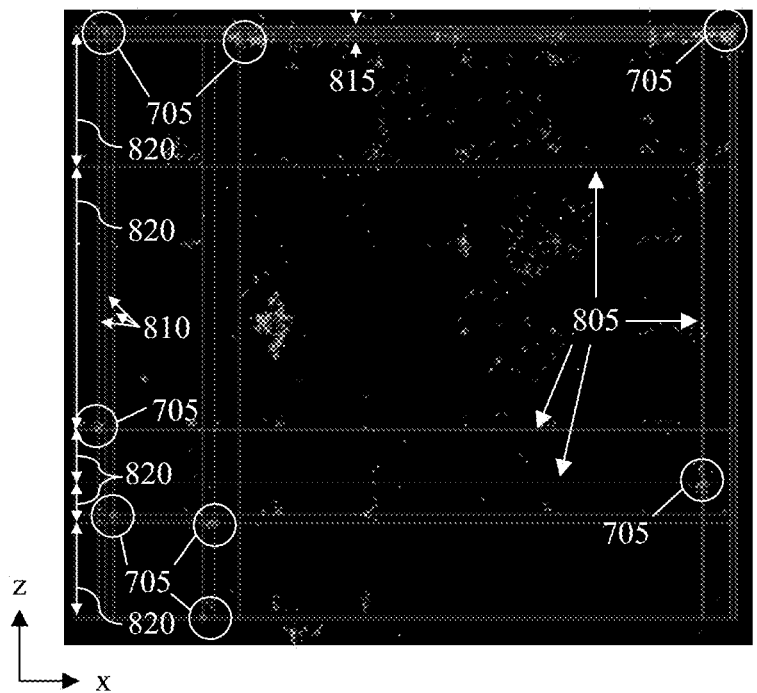
FIG. 8 is another overhead plan view of the dense point cloud of FIG. 6 showing generated planes.

FIG. 8 is another overhead plan view of the dense point cloud of FIG. 6 showing generated planes. Within FIG. 8, planes have been generated for the detected edges. As pictured, the planes that are generated for the edges appear as lines through the endpoints 705. The planes are parallel to the x-axis representing planes parallel to the x-y plane and as lines parallel to the z-axis representing planes parallel to the y-z plane. Each of points 705, representing an edge, has a line (plane) in the x direction and a line (plane) in the z direction going through the point. FIG. 8 displays both true and false types of planes. Several false planes are labeled as 805 within FIG. 8. As pictured, false planes 805 have points located on each side of the plane that is formed.

Planes 810 and 815 illustrate examples where a plurality of planes are located within a predetermined distance of one another and may be merged into a single plane. Planes are merged, as discussed, prior to removing or identifying false planes. Subsequent to the merging, it may be seen that the resulting plane from merging planes 810 is divided into 5 segments by crossing planes (e.g., where planes 815 are merged and other parallel and close planes are also merged). The resulting segments of the plane resulting from the merger of planes 810 are illustrated by arrows 820.

Figure 9:
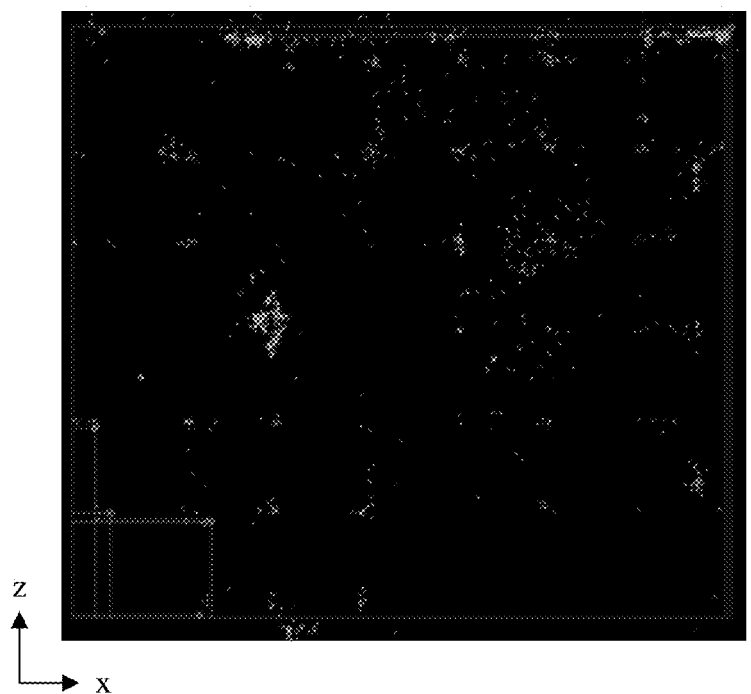
FIG. 9 is another overhead plan view of the dense point cloud of FIG. 6 after removing false planes.

FIG. 9 is another overhead plan view of the dense point cloud of FIG. 6 after removing false planes. As illustrated, false planes, including false planes 805, have been removed from the overhead plan view leaving what are considered true planes that may be rendered as interior walls or doors in this example. In the example of FIG. 9, false plane removal may be performed on a per segment basis. As pictured, some segments 820 were determined to be false planes and removed while others were determined to be true and remain.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagram in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method may include detecting, using a processor, a plurality of edges in a plurality of images, determining, using the processor, a set edges from the plurality of edges that are matched across the plurality of images, and estimating, using the processor, camera poses of the plurality of images using a cost function that depends upon the set of edges.

The method may include generating planes for a 3D model according to the camera poses and the set of edges.

Generating planes may include determining three orthogonal axes according to the set of edges.

Determining three orthogonal axes may include grouping edges of the set of edges into a plurality of buckets according to orientation, determining a first axis as the bucket including a largest number of edges, determining a second axis as the bucket including a second largest number of edges, and determining a third axis as a cross-product of the first axis and the second axis. In one aspect, the second axis may be adjusted to be orthogonal to the first axis.

The method may include determining planes for edges of the set of edges, identifying false planes from among the determined planes, and removing the false planes.

The method may also include rendering the planes.

A system may include a processor programmed to initiate executable operations. The executable operations may include detecting a plurality of edges in a plurality of images, determining a set edges from the plurality of edges that are matched across the plurality of images, and estimating camera poses of the plurality of images using a cost function that depends upon the set of edges.

The processor may be programmed to initiate executable operations including generating planes for a 3D model according to the camera poses and the set of edges.

Generating planes may include determining three orthogonal axes according to the set of edges.

Determining three orthogonal axes may include grouping edges of the set of edges into a plurality of buckets according to orientation, determining a first axis as the bucket including a largest number of edges, determining a second axis as the bucket including a second largest number of edges, and determining a third axis as a cross-product of the first axis and the second axis. The processor may be further programmed to initiate executable operations including adjusting the second axis to be orthogonal to the first axis.

In another aspect, the processor may be programmed to initiate executable operations including determining planes for edges of the set of edges, identifying false planes from among the determined planes, and removing the false planes.

The processor may also be programmed to initiate executable operations including rendering the planes.

A computer program product may include a computer readable storage medium having program code stored thereon. The program code may be executable by a processor to perform a method. The method may include detecting, using the processor, a plurality of edges in a plurality of images, determining, using the processor, a set edges from the plurality of edges that are matched across the plurality of images, and estimating, using the processor, camera poses of the plurality of images using a cost function that depends upon the set of edges.

The method may include generating planes for a 3D model according to the camera poses and the set of edges.

Generating planes may include determining three orthogonal axes according to the set of edges.

Determining three orthogonal axes may include grouping edges of the set of edges into a plurality of buckets according to orientation, determining a first axis as the bucket including a largest number of edges, determining a second axis as the bucket including a second largest number of edges, and determining a third axis as a cross-product of the first axis and the second axis. The method may also include adjusting the second axis to be orthogonal to the first axis.

In another aspect, the method may include determining planes for edges of the set of edges, identifying false planes from among the determined planes, removing the false planes, and rendering the planes.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    detecting, using a processor, a plurality of edges in a plurality of images;
    determining, using the processor, a set of edges from the plurality of edges that are matched across the plurality of images;
    determining, using the processor, three orthogonal axes according to the set of edges by grouping edges of the set of edges into a plurality of buckets according to orientation, wherein each of a first axis and a second axis of the three orthogonal axes is determined according to one of the plurality of buckets based upon a number of edges in the plurality of buckets;
    estimating camera poses of the plurality of images using a cost function that depends upon the set of edges;
    generating planes for a 3-dimensional model according to the camera poses and the set of edges, wherein the 3-dimensional model is generated from the plurality of images;
    identifying false planes from among the planes; and
    removing the false planes.

2. The method of claim 1, wherein a third axis of the three orthogonal axes is determined according to a function of the first axis and the second axis.

3. The method of claim 1, wherein determining three orthogonal axes further comprises:
    determining the first axis according to the bucket including a largest number of edges;
    determining the second axis according to the bucket including a second largest number of edges; and
    determining a third axis according to a cross-product of the first axis and the second axis.

4. The method of claim 3, further comprising:
    adjusting the second axis to be orthogonal to the first axis.

5. The method of claim 1, further comprising:
    rendering the planes.

6. A system, comprising:
    a memory configured to store program code; and
    a processor coupled to the memory, wherein the processor is programmed using the program code to initiate executable operations comprising:
        detecting a plurality of edges in a plurality of images;
        determining a set of edges from the plurality of edges that are matched across the plurality of images;
        determining, using the processor, three orthogonal axes according to the set of edges by grouping edges of the set of edges into a plurality of buckets according to orientation, wherein each of a first axis and a second axis of the three orthogonal axes is determined according to one of the plurality of buckets based upon a number of edges in the plurality of buckets;
        estimating camera poses of the plurality of images using a cost function that depends upon the set of edges;
        generating planes for a 3-dimensional model according to the camera poses and the set of edges, wherein the 3-dimensional model is generated from the plurality of images;
        identifying false planes from among the planes; and
        removing the false planes.

7. The system of claim 6, wherein a third axis of the three orthogonal axes is determined according to a function of the first axis and the second axis.

8. The system of claim 6, wherein determining three orthogonal axes comprises:
    determining the first axis according to the bucket including a largest number of edges;
    determining the second axis according to the bucket including a second largest number of edges; and
    determining a third axis according to a cross-product of the first axis and the second axis.

9. The system of claim 8, wherein the processor is further programmed to initiate executable operations comprising:
    adjusting the second axis to be orthogonal to the first axis.

10. The system of claim 6, wherein the processor is further programmed to initiate executable operations comprising:
    rendering the planes.

11. A computer program product comprising a computer readable storage medium having program code stored thereon, the program code executable by a processor to perform a method comprising:
    detecting, using the processor, a plurality of edges in a plurality of images;
    determining, using the processor, a set of edges from the plurality of edges that are matched across the plurality of images;
    determining, using the processor, three orthogonal axes according to the set of edges by grouping edges of the set of edges into a plurality of buckets according to orientation, wherein each of a first axis and a second axis of the three orthogonal axes is determined according to one of the plurality of buckets based upon a number of edges in the plurality of buckets;
    estimating, using the processor, camera poses of the plurality of images using a cost function that depends upon the set of edges;
    generating planes for a 3-dimensional model according to the camera poses and the set of edges, wherein the 3-dimensional model is generated from the plurality of images;
    identifying false planes from among the planes; and
    removing the false planes.

12. The computer program product of claim 11, wherein a third axis of the three orthogonal axes is determined according to a function of the first axis and the second axis.

13. The computer program product of claim 11, wherein determining three orthogonal axes further comprises:
    determining the first axis according to the bucket including a largest number of edges;
    determining the second axis according to the bucket including a second largest number of edges; and determining a third axis according to a cross-product of the first axis and the second axis.

14. The computer program product of claim 13, wherein the method further comprises:
adjusting the second axis to be orthogonal to the first axis.

15. The computer program product of claim 11, wherein the method further comprises:
rendering the planes.

* * * * *